Jan. 14, 1930.   H. H. EDELE   1,743,121
DRIVING AND STEERING MECHANISM FOR CHILDREN'S VEHICLES
Filed April 18, 1928   2 Sheets-Sheet 2
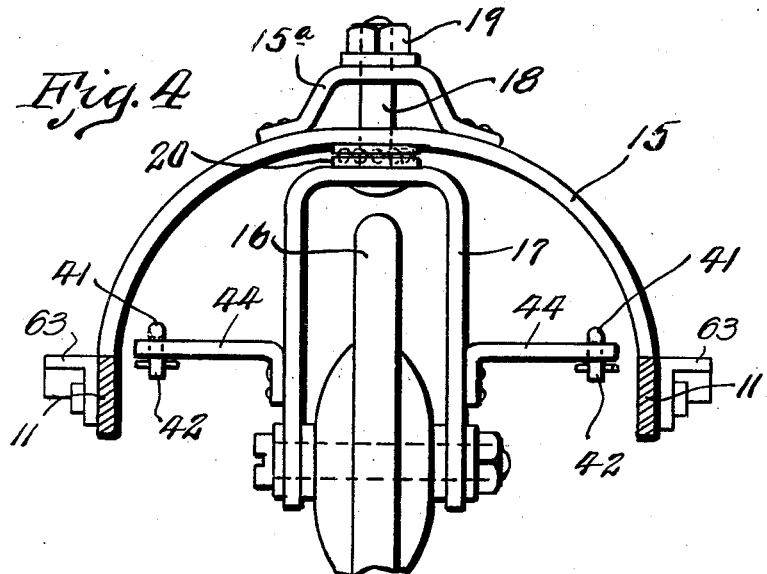
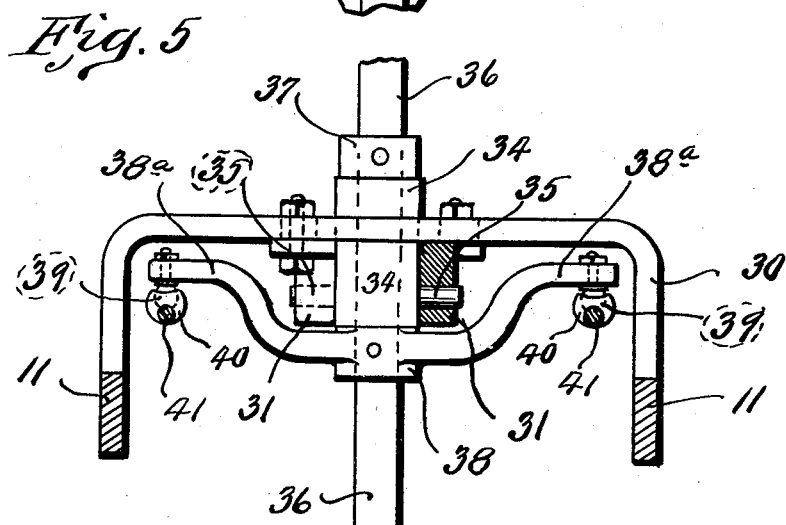
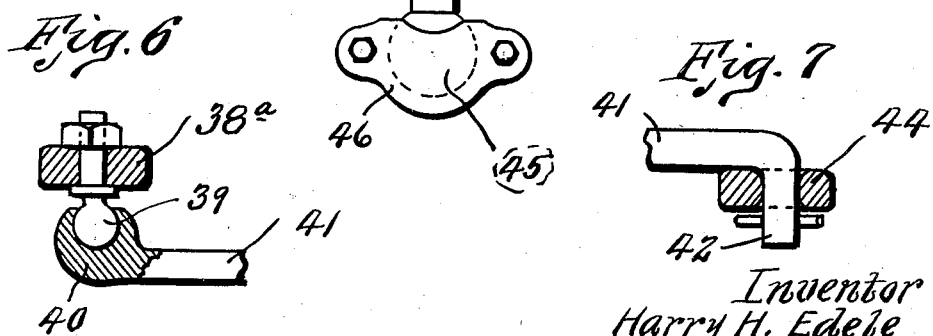
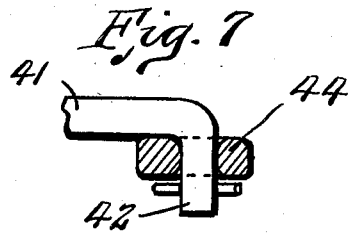
Inventor
Harry H. Edele
By Cornwall, Pridell & Janne
Attys.

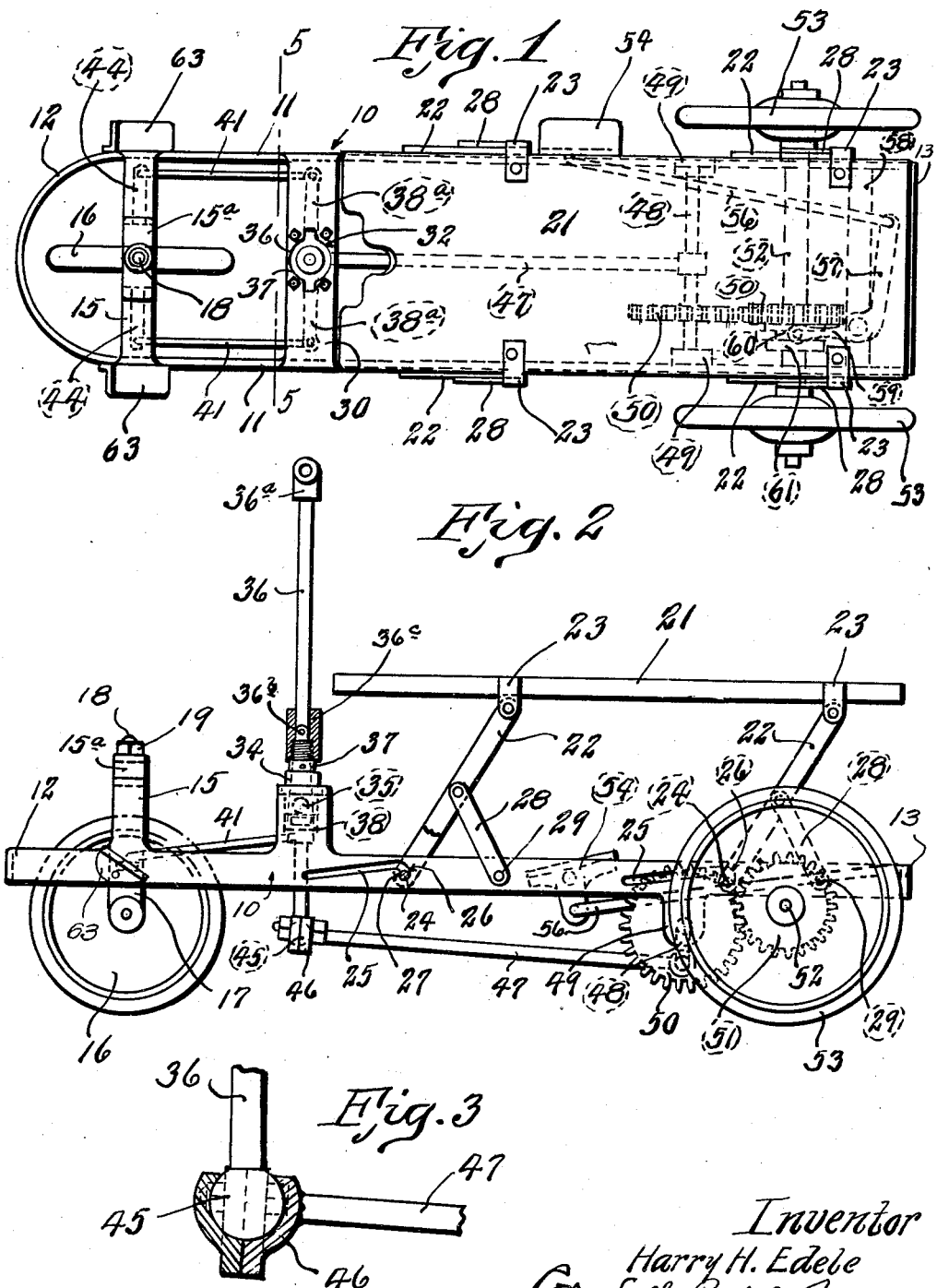

Patented Jan. 14, 1930

1,743,121

UNITED STATES PATENT OFFICE

HARRY H. EDELE, OF ST. LOUIS, MISSOURI

DRIVING AND STEERING MECHANISM FOR CHILDREN'S VEHICLES

Application filed April 18, 1928. Serial No. 270,988.

This invention relates to a child's vehicle of the type disclosed in my copending application filed September 13, 1926, Serial No. 135,081, which application matured into patent No. 1,677,586, dated July 17, 1928.

In this type of vehicle, a platform is provided which is adjustable from its normal position on the chassis into a raised position so that the said vehicle can be used either as a scooter with the platform lowered, or as a tricycle with the child straddling the raised platform or seat.

The objects of the present invention are to provide a child's vehicle in which both the steering means and the driving mechanism are connected to a single handle or actuating member, whereby both said steering means and said driving mechanism can be actuated simultaneously by the operation of said handle.

Other objects of the invention are to so mount the handle that it may be partially rotated about its longitudinal axis for steering purposes, without interfering with the driving mechanism, said handle being oscillatable to actuate the driving mechanism without affecting the steering connections.

Other objects of the invention are to provide a ball and socket operative connections between the lower end of the handle and the connecting rod of the driving mechanism and between the cross arm carried by said handle and the links and the ends of the links rotated with said cross arm, the opposite ends of said links being connected to the rotatable frame of the steering wheel.

With these and other objects in view, my invention consists in certain novel features of construction and arrangements of parts hereinafter more fully described, and claimed, and illustrated in the accompanying drawings, in which—

Figure 1 is a top plan view of my improved vehicle.

Figure 2 is a side elevational view thereof showing the platform in raised position.

Figure 3 is an enlarged cross sectional view of the lower end of the handle and the connecting rod showing the ball and socket connection thereof.

Figure 4 is an enlarged front elevational view of the vehicle partly broken away.

Figure 5 is an enlarged cross section taken on lines 5—5 of Figure 1.

Figure 6 is an enlarged detail view of one end of the cross arm and the link.

Figure 7 is an enlarged sectional detail view of the opposite end of the link and the frame of the steering wheel.

In the present invention, the arrangement of construction of the vehicle is substantially the same as in the afore-mentioned application, there being only a few unimportant changes in the details of construction of the frame, and the means for disconnecting the driving mechanism.

Referring by numerals to the accompanying drawings, 10 indicates a frame having side members 11 connected at their forward ends by a forwardly curved or bowed portion 12 which is preferably formed integral with said side members 11 and connected at their rear ends by a transverse member 13. A cross piece 15 is connected at its ends to said members 11 and curves upwardly a suitable distance to provide a clearance for a front wheel 16 carried by an inverted U-shaped member 17. The latter has an upwardly projecting spindle 18 which extends through apertures in bowed portion 15 and extension 15ª and receives at its threaded end a nut 19 by means of which it is held in position. An end thrust ball bearing 20 is interposed between members 17 and 15 and facilitates the steering movement of member 17.

A platform 21 is arranged above frame 10 and is substantially of the same width and length as said frame with the exception of the forward end which terminates a suitable distance from bowed portion 15. This platform is supported in position by arms 22 arranged in pairs on each side of said platform and pivotally connected thereto at their upper ends as indicated at 23. These arms are disposed forwardly of their pivotal connections 23 and the lower ends of said arms are provided with lateral and inward projections 24 which operate in slots 25 disposed in side members 11. These slots are inclined forwardly and have their rear ends turned downwardly as indicated at 26 so as to form shoulders 27, which, when the platform occupies a raised position, as shown in Figure 2, form abutments or stops for the projections 24 and prevent the collapse of arms 22 and platform 21.

A link 28 is pivotally connected at one end to each arm 22 at a point arranged a suitable distance intermediate the ends of said arm, while the opposite or lower end of said link is pivotally connected to side member 11 as indicated at 29 at a point spaced rearwardly of the rear end 26 of the corresponding slot 25. These links cooperate with the shoulders 27 in holding the arms 22 in extended positions.

To lower the platform, the lower ends of arms 22 are moved a slight distance upwardly to bring projections 24 out of engagement with shoulders 27 whereupon said projections 24 will ride forwardly in slots 25 and cause platform 21 to be brought against frame 10.

A transverse member 30 substantially of inverted U-shape has its ends fixed to side members 11 in any suitable manner, such as welding, and bridges said side members at a point spaced a suitable distance rearwardly of bowed portion 15. A pair of bearings 31 is secured to the underside of member 30 to each side of opening 32 which latter is disposed substantially centrally in the horizontal portion of member 30. A sleeve 34 extends through said opening and is provided with trunnions 35 which are journalled in said bearings 31. Passing through this sleeve and revolubly mounted therein is a rod 36 of the combined steering and driving mechanism. This rod extends upwardly a suitable distance beyond platform 20 and is provided with a handle 36ª by means of which it may be operated. This rod is supported in sleeve 34 by means of a collar 37 which is fixed to said rod and bears against the upper end of said sleeve. A tubular member 38 is fixed to rod 36 immediately below sleeve 34 and is provided with lateral projections or cross arms 38ª, the ends of which are provided with spherical extensions 39. These spherical extensions are incased in socket members 40 carried by the rear ends of steering links 41. These links extend forwardly under member 15 and have the forward ends terminating in hooks 42 which are pivotally connected to the ends of lateral arms 44 projecting from journal piece or U-shaped member 17.

To steer the vehicle, rod 36 is partially turned in proper direction thereby causing, through links 41, rotation of member 17 in the appropriate direction.

The lower end of rod 36 extends below members 38 and terminates in the spherical enlargement 45 which is enclosed in a socket member 46 carried by the forward end of a connecting rod 47. The rear end of this rod is pivotally connected to a crank shaft 48 which is journalled in bearings 49 extending from the side pieces 11. A driving gear 50 is fixed to crank shaft 48 and meshing with this gear is a pinion 51 which is slidably arranged on a rear axle 52 in driving engagement therewith.

Thus, when member 36 is oscillated on trunnions 35, connecting rod 47 has imparted thereto reciprocating movement and actuates shaft 48 and gear 50 carried thereby. The latter, in turn, drives pinion 51 and axle 52 carrying rear wheels 53. The member 36 can be operated to actuate the steering means without affecting the driving mechanism by virtue of the fact that said member is freely mounted in bearing 34 and can be partially rotated on its longitudinal axis due to its ball and socket connection with the connecting rod 47. Furthermore, said member 36 can be operated to actuate the driving mechanism without affecting the steering means due to the fact that cross arm member 38 is disposed close to trunnions 35 whereby the arc of movement imparted to said member 38 is very slight and has ball joint connections with the drag links 41 which permit oscillatable motion of member 36 without imparting any movement to the steering frame 17.

The ball and socket connections between member 36 and connecting rod 47 allow revoluble movement of member 36, and, at the same time, provide an operating connection therebetween when member 36 is oscillated.

When it is desired to disengage the driving connection between member 36 and axle 52, pinion 51 is moved longitudinally on said axle out of engagement with driver gear 50, by means of a treadle 54 which is pivotally mounted on one of the side pieces 11 and has a pivotal connection with the forward end of a rod 56, the rear end of which is pivotally connected to a bell crank 57. The latter is pivotally mounted on member 58 and has its opposite end bifurcated as indicated at 59 for engagement with annular groove 60 of a member 61 which latter is conjoined to pinion 51. Thus, by actuating treadle 54 in the appropriate directions, pinion 51 is either engaged with or disengaged from gear 50.

Bar 36 is preferably provided near collar 37 with a hinge joint 36ᵇ by means of which the upper portion of bar 36 can be moved into substantially horizontal position when it is desired to pull the vehicle instead of propelling it by the actuation of the driving mechanism.

A sleeve 36ᶜ is adapted to be slipped over the joint and screw threaded against the lower portion to render said hinged joint rigid when bar 36 is used as the actuating member.

The ends of arms 38ª are offset upwardly in order to bring the connections of links 41 therewith, in a substantially horizontal plane with the trunnions 35, thereby minimizing the oscillatory motion thereof.

The arrangement of bar 36 in combination with the steering means and the driving mechanism enables the operator to steer and drive the vehicle by the use of a single member while treadle 54 permits ready means for engaging and disengaging the driving mechanism. An extension 63 is fixed to each side member 11 near the forward ends thereof to provide foot rests. A child's vehicle of my improved construction is of simple and durable construction, can be easily operated and controlled, and can be readily adjusted to be used either as a scooter or as a mechanically propelled car.

It is obvious that minor changes in the construction and arrangements of parts of my improved vehicle can be made and substituted for those herein shown and described without departing from the spirit of my invention.

I claim:

1. A child's vehicle comprising a wheeled frame, driving mechanism, steering means, a handle bar mounted in said frame for oscillatory and rotative movements, a connecting rod for operating said driving mechanism and having a ball and socket connection with said handle bar, cross arms fixed to said handle bar, and links for actuating said steering means and having ball joints with the ends of said cross arms.

2. A child's vehicle comprising in combination a wheeled frame, driving mechanism, steering means, an oscillatable bearing carried by said frame, an actuating handle bar rotatably mounted in said bearing and oscillatable therewith, a connecting rod for actuating said driving mechanism, said connecting rod having a ball and socket engagement with the lower end of said bar, a cross arm member fixed to said bar, and a pair of drag links having ball and socket joints with the ends of said cross arms and operatively connected to said steering means.

3. A child's vehicle comprising in combination a wheeled frame, driving mechanism therefor, steering mechanism, a cross member extending transversely of said frame near the forward end thereof, a vertically disposed bearing mounted for oscillatory motion in said cross member, a handle bar rotatably mounted in said bearing and oscillatable therewith, a connecting rod for actuating said driving mechanism and having one end forming a ball and socket engagement with the lower end of said bar, a member fixed to said bar adjacent to said oscillatable bearing and providing with a pair of cross arms extending transversely of said vehicle, a pair of drag links having ball and socket connections with the ends of said cross arms, and transverse extensions on said steering means for receiving the opposite ends of said drag links, whereby said steering mechanism is actuated by the rotative movement of said bar and said driving mechanism is actuated by the oscillatory movement of said bar.

4. In a child's vehicle, the combination with a wheeled frame including steering means and driving mechanism therefor, of a bearing fixed to said frame, a tubular bearing mounted in said first bearing for oscillatory movement, a handle bar revolubly mounted in said tubular bearing and oscillatory therewith, a connecting rod for said driving mechanism, a ball and socket connection between the lower end of said handle bar and one end of said connecting rod, and a horizontally and transversely disposed member fixed to said handle bar and rotatable therewith and operatively connected to said steering means.

5. In a child's vehicle, the combination with a wheeled frame, steering means and driving mechanism therefor, of a bearing fixed to said frame, a vertically disposed tubular bearing mounted in the first bearing for oscillatory movement, a handle bar rotatably mounted in said tubular bearing and oscillatory therewith, said handle bar being held against vertical movement relative to said tubular bearing, a connecting rod extending from the driving mechanism, a ball and socket connection between the lower end of said handle bar and one end of said connecting rod, a transverse member fixed to said handle bar and operatively connected to said steering means whereby the latter is operated by partially rotating said handle bar.

6. A child's vehicle comprising in combination a wheeled frame including a rear axle, steering means for the front end of said wheeled frame, a bearing supported on said frame, a tubular member, trunnions on said tubular member and journalled in said bearing for oscillatory movement in a vertical plane, a vertically disposed handle bar revolubly mounted in said tubular member and oscillatory therewith, driving mechanism for said rear axle, a conecting rod extending from said driving mechanism, a universal joint connection between the lower end of the handle bar and one end of said connecting rod whereby said driving mechanism is actuated by the oscillatory movement of said handle bar, and a transverse member fixed to said handle bar near the pivotal point thereof and operatively connected to said steering means whereby the latter is actuated by partially rotating said handle bar.

7. A child's vehicle comprising in combination a wheeled frame including a rear axle, steering means for the front end of said wheeled frame, a bearing supported on said frame, a tubular member, trunnions on said tubular member and journalled in said bearing for oscillatory movement in vertical plane, a vertically disposed handle bar revolubly mounted in said tubular member and oscillatory therewith, driving mechanism for said rear axle, a connecting rod extending from said driving mechanism, a universal joint connection between the lower end of the handle bar and one end of said connecting rod whereby said driving mechanism is actuated by the oscillatory movement of said handle bar, a transverse member fixed to said handle bar near the pivotal point thereof and operatively connected to said steering means, whereby the latter is actuated by partially rotating said handle bar, and means for disengaging said driving mechanism.

8. A child's vehicle comprising in combination a wheeled frame including a rear axle, steering means for the front end of said wheeled frame, a platform on said frame, a bearing supported on said frame, a tubular member, trunnions on said tubular member and journalled in said bearing for oscillatory movement in a vertical plane, a vertically disposed handle bar revolubly mounted in said tubular member and oscillatory therewith, driving mechanism for said rear axle, a connecting rod extending from said driving mechanism, a universal joint connection between the lower end of the handle bar and one end of said connecting rod whereby said driving mechanism is actuated by the oscillatory movement of said handle bar, a transverse member fixed to said handle bar, and a pair of drag links having ball joints with the ends of said transverse member and operatively connected to said steering means.

In testimony whereof I hereunto affix my signature this 14th day of April, 1928.

HARRY H. EDELE.